United States Patent [19]

Schubert et al.

[11] Patent Number: 4,780,484

[45] Date of Patent: Oct. 25, 1988

[54] MOLDING MATERIAL AND ITS USE AS CONSTRUCTION AND REPAIR MATERIAL

[75] Inventors: Bernd Schubert, Leverkusen; Klaus D. Rohardt, Quickborn; Michael O. Grau, Hamburg, all of Fed. Rep. of Germany

[73] Assignee: Mankiewicz Gebr. & Co. (GmbH & Co. KG), Hamburg, Fed. Rep. of Germany

[21] Appl. No.: 148,706

[22] Filed: Jan. 26, 1988

[30] Foreign Application Priority Data

Jan. 27, 1987 [DE]   Fed. Rep. of Germany ....... 3702667

[51] Int. Cl.$^4$ ............................................. C08G 18/14
[52] U.S. Cl. ................................... 521/106; 521/902; 521/903; 521/906; 524/707
[58] Field of Search ............... 521/106, 902, 903, 906; 524/707

[56] References Cited

U.S. PATENT DOCUMENTS 4,129,693  12/1978  Cenker et al. ........................ 521/106
4,724,250   2/1988  Schubert et al. .................... 524/707

*Primary Examiner*—Maurice J. Welsh
*Attorney, Agent, or Firm*—Cushman, Darby & Cushman

[57] ABSTRACT

A molding material based on polyisocyanato-isocyanurates, polyols and flameproofing and fireproofing agents, as well as optionally polyisocyanates, fillers and promoters is described which is preferably in the form of a 2-component material and comprises 5 to 40% by weight of branched polyols, 20 to 40% by weight of the isocyanurate of 1,6-hexamethylene diisocyanate, 0 to 20% by weight of crude MDI and/or prepolymer of polyol and crude MDI and/or isophorone diisocyanate optionally in combination with further isocyanate groups containing compounds, 5 to 20% by weight of a fireproofing mixture mainly consisting of secondary ammonium phosphate, 0 to 50% by weight filler and 0 to 5% by weight promoter. This mass, which permits quick processing at room temperature or slighty increased temperatures, is useful as construction and repair material for many applications, especially in connection with the construction and repair of land, air and water vehicles. The products obtained after curing meet the highest requirements with regard to fire protection and possess excellent mechanical properties.

14 Claims, No Drawings

MOLDING MATERIAL AND ITS USE AS CONSTRUCTION AND REPAIR MATERIAL

BACKGROUND OF INVENTION

The invention relates to a novel molding material based on polyisocyanato-isocyanurates, polyols and flameproofing and fireproofing agents, as well as optionally polyisocyanates, fillers and promoters, which is particularly suitable for use as construction and repair material and especially from the quick processing and the fire protection standpoint leads to excellent products.

Duroplastic compounds and foams of polyurethane with isocyanate and isocyanurate components, epoxy resins (EPO resins), phenolic resins and novolacs are known, which contain flame-inhibiting additives and which constitute difficultly or nonflammable materials. In order to improve the fire resistance and achieve a low smoke density and toxicity, a large number of different formulations has been proposed. As flame-inhibiting additives are inter alia proposed $Al_2O_3 \times H_2O$, organic and inorganic phosphates or phosphonates, borates, silicates, chlorinated paraffins, halogen compounds, heavy metal salts, elementary phosphorus, polyphosphates and antimony trioxide. Reference is made in exemplified manner in this connection to U.S. Pat. Nos. 4,126,473 and 4,147,690, European Pat. No. 69 975 and DE-OS No. 31 05 047. A survey of the prior art appears in Becker-Braun, Kunststoffhandbuch, vol. 7, Polyurethanes, second edition, 1983, Hanser-Verlag; J. Troitzsch, Brandverhalten von Kunststoffen, Grundlagen etc., Carl Hanser-Verlag, 1982; and Polymerwerkstoffe, vol. 2, Technologie 1, H. Batzer et al., Georg Thieme Verlag, Stuttgart, 1984.

With individual additions or combinations of such flame-inhibiting additives in part very satisfactory results are obtained. In view of the great increase in the use of plastics, nowadays extreme demands regarding fire protection are made in the field of the conveyance of passengers through a number of standards and specifications, particularly with respect to the aircraft and car industry, as well as in ships, trains and in the building industry. This is documented in various national and international test standards, such as DIN 75200, DIN 4102, DV 899/35 (Germany), FAR 25.853, MVSS 25.853 (USA), AFNOR P 92-507 (France), etc. As it is to be expected that these standards will be made even stricter in future and apart from non-flammability, special importance will be attached to the density and toxicity of the smoke gas in the case of charring and/or fires, in 1979 the Airbus consortium drafted its own stricter standards, ATS 1000.001 and made it available to the relevant branches of industry. In the case of an estimated aircraft life of at least 15 years, this standard already takes account of future technical developments and demands (ct. TÜ 21, 1980, No. 2, February, pp 79–82 and "Die chemische Produktion", 1983, pp 50–53).

The one- and two-component molding materials presently used in the aircraft industry do not yet meet the requirements of ATS 1000.001.

In the aircraft industry such molding materials are e.g. used for producing reinforcements and mountings (inserts), internal coverings (e.g. side walls and partitions, as well as roof coverings), floors, insulating and covering plates, as well as molded parts. Particular preference is given to the use of so-called prepreg components (sandwich honeycomb constructions), which are constituted by phenolic resin honeycombs coated with multilayer resin mats (trade name Nomex). The resin mats (prepegs) comprise E-glass fabrics, which are impregnated with resins based on phenol/formaldehyde, unsaturated polyesters, EPO and polyimides. With a view to increasing stability and saving edging profiles, an edge filling mass is often pressed into the honeycombs on the edges of the sandwich components.

A molding material able to satisfy demands in the foreseeable future must cure without shrinkage and lead to a construction material with a low density of approximately 0.2 to 0.8 $g/cm^3$, which ensures high bending and compression strengths both at ambient temperature and under continuous thermal influences up to 80° or 130° C. To this must be added the demands in connection with fire and/or charring, namely non-flammability, no dripping, insignificant smoke gas emission and substantially non-toxic pyrolysis gas evolution. For special uses (e.g. fire protection walls in the transportation area of aircraft) higher thermal stability would also be necessary, i.e. the material must be able to withstand e.g. a temperature of 1000° to 1200° C. for 10 minutes. With regards to the conventional composite system in which such molding materials are used, there must be an optimum connection or adhesion with the materials forming the basis of such composite systems, such as polymers, polycondensates or polyaddition compounds (e.g. unsaturated polyesters, EPO resins, phenolic resins, polyimide or polyurethane). It is necessary or at least desirable to also have an optimum connection or adhesion to metals and materials such as glass and carbon fibres.

The formulations and systems known from the prior art, which are described in numerous patent specifications and applications, only partly fulfil certain of the above requirements or combinations of partial ranges thereof.

Thus, European Patent application No. 157 1433 describes fire-inhibiting sealing compounds, which comprise melamines and a number of fillers which, apart from other inadequacies, have densities of 0.7 to 1.0 $g/cm^3$.

DE-OS No. 35 19 581 describes ablation coatings of amine-cured EPO and polysulphide resin mixtures with pre-ox-carbon fibres as a reinforcement which, although resistant to high temperatures, have densities well above 1.0 $g/cm^3$.

DE-OS No. 27 14 006, DE-OS No. 27 13 984 and DE-OS No. 27 40 504 describe molding materials comprising polyisocyanate and hollow spheres. These are cured through access of atmospheric humidity and optionally after addition of water. Preferably, shortly prior to processing phosphoric acid and/or phosphates or their aqueous solutions or alkali silicate solutions are added. The molding materials described in these patent applications only have a relatively low compression strength in the cured state and are only storage-stable in the form of premixes constituted by polyisocyanate and hollow spheres. However, they are not stable as moisture-curing one-component materials and therefore do not have the processing advantages linked with the latter. Tests have revealed that e.g. mixtures of hollow spheres with 2% polyisocyanates do not give stable materials. Materials produced according to the process of claim 2 of DE-OS No. 27 14 006 (plates with a thickness of 5 to 10 mm) were unable to withstand a temperature of 1080° C. for one minute.

Therefore the problem existed to avoid the above described disadvantages of known molding materials and to obtain improvements to the characteristics, particularly in the fire protection field. Especially there existed the problem of providing molding materials which, apart from the aforementioned characteristics, in the cured state have high compression strength characteristics not only at ambient temperature but also at elevated temperatures up to 80° C. (decrease of compression strength at 80° C. in comparison to room temperature of less than 40%), meet very high demands regarding flammability, smoke gas density and the evolution of toxic pyrolysis gases in the case of charring and/or fire, do not afterflame, do not drip, are resistant to water, hydraulic fluid and kerosene, provide excellent binding to any standard prepreg materials, metals and fibrous materials and cure in shrinkage-free manner.

For the solution of these problems a one-component molding material based on polyisocyanato-isocyanurates and flameproofing and fireproofing agents as well as optionally polyisocyanates, fillers and promoters has been proposed in prior application Ser. No. 24026 filed on Mar. 10, 1987 comprising:

A. 40 to 80% by weight of the isocyanurate of 1,6-hexamethylene diisocyanate with a NCO content of 18 to 24% by weight,
B. 0 to 20% by weight of crude MDI and/or prepolymer of polyol and crude MDI and/or isophorone diisocyanate optionally in combination with dimerized triazine of TDI, copolymerized triazine of TDI and HDI and/or naphthalene diisocyanate,
C. 5 to 20% by weight of a mixture of:
  a. 50 to 100% by weight of secondary ammonium phosphate with the proviso that the amount of secondary ammonium phosphate is 80 to 100% by weight if component C is only present in an amount of 5 to 10% by weight,
  b. 0 to 20% by weight of primary ammonium phosphate,
  c. 0 to 20% by weight of zeolite and/or crystalline alkali silicate,
  d. 0 to 20% by weight of finely divided silica,
  e. 0 to 20% by weight of $Ca_3(PO_4)_2$,
  f. 0 to 20% by weight azodicarbonamide,
  g. 0 to 20% by weight calcined calcium oxide,
D. 0 to 50% by weight of filler and
E. 0 to 5% by weight promoter.

After cold shaping, the curing of this molding material takes place by ramming, rolling, pressing, extruding, shaking in, blowing in, etc. at ambient or elevated temperature through the action of atmospheric humidity or water vapour. At ambient temperature curing takes place within about 7 dauys or within a single day when adding about 1 to 3% by weight of the above mentioned promoters. However, preferably curing takes place at 110° to 200° C. (e.g. 130° C.) without promoter in about 0.5 to 3 hours. Generally there is a not inconsiderable aftercuring, so that the initially obtained compression strength, e.g. after 4 weeks, can increase by about 20 to 30% and even up to 50%. When curing this molding material, the expert will obviously take account of the molding geometry and thermal conductivity and will choose the necessary curing time accordingly (cf. e.g. DE-OS No. 27 14 006, p 23). Otherwise curing takes place at usual pressures, e.g. atmospheric pressure (pressures of about 0.5 to 50 bar normally being used).

If the relative atmospheric humidity during curing is below about 40%, it is advantageous to add water in concentrations of 1 to 10% by weight, there being no need to define the water quantity. Water can be replaced by aqueous basis, such as e.g. caustic soda and caustic potash solution, or alkaline-reacting compounds, such as sodium or potassium silicates in the form of their aqueous solutions. Ammonium phosphate solutions are also very suitable. Generally 0.5 to 5N solutions are used.

Though the molding material according to this prior patent application completely fulfills the above outlined requirements, it has turned out that in practice it is often desirable to have a molding material which can be used at ambient temperature and permits a quick or quicker processing without using presses or autoclaves. On the one hand curing times of about 7 days or one day when adding promoters (see above) are often not acceptable and on the other hand it is often not possible or at least not desirable to apply temperatures in the above mentioned range of about 110° to 200° C. This is especially true for repairs and particularly for repairs to be carried out in situ which because of the minor influence of the repair material on the overall properties of the repaired part (e.g. volumetric weight) do not to the same extent require the fulfillment and achievement of all of the above mentioned optimum characteristics of the molding material.

OBJECT OF THE INVENTION

Therefore it is an object of this invention to provide a molding material which substantially possesses the advantageous characteristics of the molding material disclosed in prior application Ser. No. 24026 but permits much quicker processing at ambient temperature or slightly increased temperatures of e.g. 60° to 80° C., preferably the use of presses and autoclaves being unnecessary.

This and further objects will become apparent as the description of the invention proceeds.

DETAILED DESCRIPTION OF INVENTION

The invention is directed to a molding material and its use as construction and repair material, especially fire protection construction and repair material as described herein and in the dependent claims.

The molding material according to the invention is a molding material based on polyisocyanato-isocyanurates, polyols and flameproofing and fireproofing agents as well as optionally polyisocyanates, fillers and promoters comprising:
A. 5 to 40% by weight of branched polyols having an OH content of 2 to 22% by weight,
B. 20 to 40% by weight of the isocyanurate of 1,6-hexamethylene diisocyanate,
C. 0 to 20% by weight of crude MDI and/or prepolymer of polyol and crude MDI and/or isophorone diisocyanate (IPDI) optionally in combination with dimerized triazine of TDI and/or copolymerized triazine of TDI and HDI and/or naphthalene diisocyanate,
D. 5 to 20% by weight of a mixture of:
  a. 50 to 100% by weight of secondary ammonium phosphate,
  b. 0 to 50% by weight of primary ammonium phosphate, c. 0 to 30% by weight azodicarbonamide,
d. 0 to 20% by weight zeolite and/or ground alkali silicate,
e. 0 to 10% by weight finely divided silica,
f. 0 to 10% by weight calcium orthophosphate and
g. 0 to 20% by weight calcined calcium oxide,
E. 0 to 50% by weight filler and
F. 0 to 5% by weight promoter.

Polyols with an OH content of 2 to 22% by weight serve as component A, i.e. bifunctional or polyfunctional polyols with functional or non-functional side groups or chains. Polyols with elastifying properties, e.g. linear polyetherols and polyesterols, are not suited for the purpose of the present invention since the compression strength of the resulting molding materials significantly decreases at higher temperatures. Branched polyols suitable according to the invention are well-known from the prior art and commercially available in unnumerous variations (cf. e.g. DE-OS No. 34 18 877, p 7, line 25 to p 9, line 26; DE-OS No. 27 40 504, p 11, line 16 to p 16, line 27; as well as the pertinent literature relating to polyurethanes, the branched polyols suitable according to the present invention often being described in connection with the so-called prepolymer technique; with regard to commercial products compare e.g. the information brochures of Bayer AG relating to the product line "Desmophen"). Due to the fact that the molding material according to the present invention is preferably completely or almost completely solvent-free only those commercial products can be used which are solvent-free or which can readily be freed from such constituents.

It has been found that propoxylated trimethylol propane with an OH content of about 11.5% by weight is particularly useful. Further, oligomeric multifunctional glycolethers with an OH content of about 22% by weight, oligomeric bifunctional polyesterols with an OH content of about 2 to 9% by weight, branched blockcopolymers of these oligomeric bifunctional polyesterols with the aforementioned propoxylated trimethylol propane or the oligomeric multifunctional glycolethers and finally fatty-acid-modified branched oligomeric polyesterols with an OH content of about 5% by weight are preferred. These preferred polyols are all commercially available and can be used as single components or in the form of any kind of mixtures (cf. also Becker-Braun, Kunststoffhandbuch, loc. cit.). Particularly preferred is, however, the sole use of propoxylated trimethylol propane.

Component B is the isocyanurate of 1,6-hexamethylene diisocyanate. In the preferred case of the ideally trimerized 1,6-hexamethylene isocyanurate it is a polyisocyanate-isocyanurate with the following formula

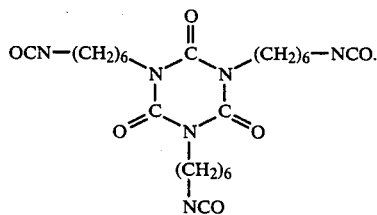

Obviously the crosslinking products resulting from this compound are also suitable. The isocyanurate of 1,6-hexamethylene diisocyanate is commercially available and normally contains less than 0.5% by weight of monomeric 1,6-hexamethylene diisocyanate. The NCO content is 18 to 24% by weight and preferably 20 to 22% by weight. Conventionally the density is about 1.2 g/cm$^3$ and the viscosity about 1000 to 3000 mPas, maintaining a suitable viscosity obviously being important from the processing standpoint. The content of the preferred ideally trimerized 1,6-hexamethylene diisocyanate differs in the various commercial products and can be e.g. 98% and higher.

The "crude MDI" consists of polyisocyanates based on diphenyl methane diisocyanate, as produced by aniline-formaldehyde condensation and subsequent phosgenation. Volatile constituents and part of the diphenyl methane diisocyanate formed are distilled off. Thus, crude MDI is a polyisocyanate from the bottom of the technical production or distillation of diphenyl methane diisocyanate (cf. e.g. DE-OS No. 27 14 006, pp 9, 18 and especially 28; Kunststoffhandbuch, vol. 7, Polyurethane, second edition 1983, p 63). It is advantageous according to the invention if the crude MDI has a high functionality, i.e. the NCO content of the crude MDI is advantageously 28 to 33% by weight, although it is also possible to use materials with a lower NCO content, such as e.g. 20% by weight. The density (20° C.) of crude MDI is normally 1.2±0.1 g/cm$^3$, whilst the viscosity is normally about 130 mPas.

In place of crude MDI, component C can also be constituted by a prepolymer obtained by reacting crude MDI with polyol in known manner. Polyols suitable for the production of prepolymers are known to the expert and therefore require no further illustration (cf. e.g. DE-OS No. 27 14 006, p 10 ff).

Instead of crude MDI or prepolymer of polyol and crude MDI or in combination with crude MDI or prepolymer of polyol and crude MDI, in component C also isophorone diisocyanate (IPDI) can be used. Also this product is commercially available.

In a further preferred embodiment of the invention in component C the crude MDI and/or isophorone diisocyanate can be combined with dimerized triazine of TDI, copolymerized triazine of TDI and HDI and/or naphthalene diisocyanate (NDI), these additional ingredients being charged as solids. Dimerized triazine of TDI is commercially available, e.g. dissolved in ethyl or butyl acetate, and has the following idealized structure:

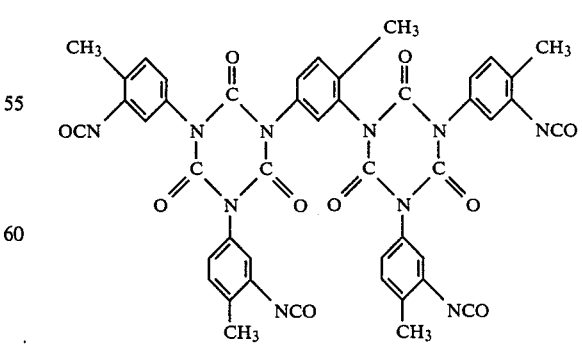

Copolymerized triazine of TDI and HDI is also commercially available dissolved in ethyl or butyl acetate and has the following idealized structure:

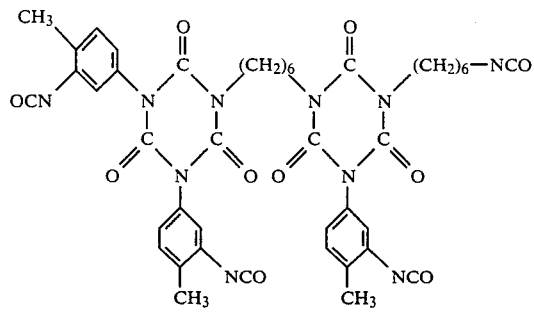

Preferably component C is present in the molding material according to the invention in an amount of 1 to 10% by weight and particularly 2 to 6% by weight, because this leads to optimum compression strength of the cured molding material.

Component D is decisively responsible for the extremely advantageous characteristics of the cured inventive molding materials with respect to non-flammability. Secondary ammonium phosphate (diammonium hydrogen phosphate, $(NH_4)_2HPO_4$), azodicarbonamide, zeolite, particularly sodium or potassium aluminosilicate, ground alkali silicates like sodium and potassium silicate, finely divided silica, particularly pyrogenic silica, calcium orthophosphate ($Ca_3(PO_4)_2$) and/or calcined calcium oxide. The mixture consists of at least 50% secondary ammonium phosphate and up to 50% of the remaining components. Experience up to now has shown that in particular a mixture of secondary ammonium phosphate, crystalline alkali silicate, pyrogenic silica and calcium orthophosphate is suitable.

It is decisive for the storage stability of the inventive molding material or its component II that the water content of the individual components thereof amounts to no more than about 0.2% by weight, based on the molding material weight, and component D consists of particles with a size in the range of 0.5 to 150 μm. Particular preference is given to a particle size distribution such that 70 to 90% by weight have a size of 5 to 100 μm, no more than 5% by weight a size of more than 100 μm and no less than 5% by weight are smaller than 5 μm. This particle size distribution applies to component D overall, but preferably also to each of its mixing components (a) to (g). To the extent that the materials used in component D are not already commercially available in the desired particle size, the particle size setting can take place in the usual way, e.g. by grinding.

The finely divided silica or calcium orthophosphate in component C mainly has a stabilizing action, so that component C can be used in the form of a free-flowing premix in the production of the inventive molding material. Suitable quantities of these components under this aspect are about 1 to 3% by weight, it being pointed out that the percentages by weight concerning the mixing constituents of component C only relate to the latter, both in the claims and in the description, i.e. the total component C corresponds to 100% by weight.

Fillers suitable for component E are practically all known fillers for such molding materials, as a function of the intended use of the inventive molding material. Examples for such fillers are talcum, stone powder, chalk, non-flammable plastic granules, inorganic solids such as CaO, $Mg(OH)_2$, $Al(OH)_3$, metal flakes, chips and powders, zeolites, pigments etc.

In view of the good results obtained therewith particular preference is given to fly ash and hollow microspheres made from glass or phenolic resins having a particle size of 5 to 200 μm and a true density of 0.15 to 0.7 g/cm$^3$. Suitable are the conventional commercial products which are known to the expert and therefore require no further explanation (with regards to hollow glass microspheres reference can e.g. be made to Kunststoffe 75, 1985, 7, pp 421 to 424). From the fire protection standpoint it is particularly preferred to use in the inventive molding material those hollow spheres which are filled with non-flammable or fire-extinguishing gases. These generally involve nitrogen and carbon dioxide, but there are also hollow spheres filled with inert gases such as argon, although they can scarcely be considered from economic standpoints.

Carbon, glass and metal fibres are also very suitable fillers. The use of carbon fibres is particularly advantageous if a high compression strength is required in the case of a low density of the cured molding material. Particularly suitable are carbon fibres and so-called pre-ox fibres formed from polyacrylonitrile (cf. e.g. DE-OS 35 19 581, pp. 6 and 7) having a thickness of 0.001 to 0.1 mm and a length of 0.005 to 50 mm and particularly 0.1 to 5 mm. Suitable metal fibres are mainly fibres of copper and stainless steel, the latter having preferably a diameter of 4 to 12 μm and a length of 1 to 12 mm.

Other suitable fillers are silica or $B_4C$ (tetraboroncarbide) with particle sizes of 1 to 70 μm.

Very suitable as filler are also aluminum flakes. Further so-called "cobweb-whiskers" have proven as extremely valuable fillers. These are fibre materials on the basis of $SiO_2$, Si, SiC and C, which consist of single fibres interlaced in the submicron and micron range. Alternatively the "cobweb-whiskers" can consist of silicon carbide fibres in admixture with silicon carbide particles (cf. e.g. the brochure of Norwegian Talc Deutschlland GmbH relating to fibre additives "XEVEX" and "XPW 2").

In addition melamine resin powders, which are commercially available, have proven to be well suited fillers. The same is true for foamed clays, e.g. commercially available under the trade name "NORPRIL" (cf. the data sheet of Norwegian Talc Deutschland GmbH of September 1986).

Inventive molding materials containing no component D, i.e. no filler, are suitable as non-flammable laminate resin for prepreg components. Low filler contents are advantageous if the inventive molding materials are to be processed to foams. In this context especially the use of hollow glass microspheres in a quantity of about 5 to 20% by weight has proven advantageous. In this connection, these spheres are also used for the pore regulation of the foam to be produced. The density of the hollow glass microspheres in the inventive molding material is preferably less than 0.4 g/cm$^3$.

As has been stated hereinbefore, the choice of the particular filler is dependent on the intended use of the inventive molding material. The expert is well aware of the way and to the extent he can influence the characteristics of the molding material by the choice of the fillers (cf. also the examples given hereinafter). However, it has been found that when using the molding material according to the invention the expected effects frequently occur in a surprisingly marked form and to an above-average extent.

Useful materials for component F are well known in the art. Thus it is possible to use as promoter or catalyst all known materials such as amines dibutyl tin dilaurate, tin mercaptate, etc. (cf. e.g. DE-OS No. 27 14 006, pp 20 and 21 and DE-PS No. 23 10 559, column 7), preference being given to tertiary amines.

The production of the molding material according to the invention causes no particular problems and is brought about by bringing together and mixing components A, B and D as well as components C, E and F, if the latter are present. It is important that moisture is substantially excluded. The inventive molding material is therefore preferably produced in an atmosphere of a dried inert gas, such as nitrogen. When using hollow microspheres, it is generally necessary to dry these beforehand, e.g. for 4 hours at 200° C. As already stated above, it is important for achieving an adequate storage stability that the water content of the individual constituents of the inventive molding material is in all no more than about 0.2% by weight.

The order in which the components of the inventive molding material are brought together is normally unimportant. In case of producing a one-component molding material (see below with regard to stability) it is however preferred to add the branched polyol at last. Further, when using hollow glass microspheres as filler, it has proven particularly advantageous if they are first introduced, followed by component B and/or C in random order and then the remaining constituents. As already mentioned above for component D, it is also preferred to prefabricate premix components C and D, if these components consist of mixtures of several constituents.

The mixing of the constituents forming the inventive molding material can take place in conventional means, e.g. forced kneaders, double Z forced kneaders, planetary mixers, suitable extruders, drum mixers, Nauta mixtures etc. Kneading is continued until a homogeneous mass is obtained, which can be established by inspection on a glass disk under a microscope. Generally kneading times of 3 minutes are adequate. In case of a 200 liter batch, the maximum kneading time is generally no more than 15 minutes, but generally much shorter kneading times are adequate as a function of the materials used.

The so produced homogeneous molding material has in the absence of component F a processing time (pot life) of 8 to 12 hours. Since this in practice is often too short, the molding material according to the invention is advantageously strongly cooled directly after its production and thereby frozen. This takes place by shock freezing to low temperatures. Temperatures around −18° or −30° C. have proven suitable, which lead to a stability of the molding material according to the present invention of about one month. After thawing to ambient temperatures the processing time is about one hour.

Storage life and processing time of the molding material according to the invention can be substantially extended by producing a two-component molding material, component I comprising component A and component II comprising component B, and if present, component C.

In particular components I and II have the following composition:

Component I:
1. 40 to 80% by weight component A,
2. 10 to 20% by weight component D,
3. 0 to 50% by weight component E and
4. 0 to 5% by weight component F and Component II:
1. 40 to 80% by weight component B,
2. 0 to 20% by weight component C,
3. 5 to 20% by weight component D,
4. 0 to 50% by weight component E and
5. 0 to 5% by weight component F, the weight percentages being based on the total amount of each of components I and II.

The thus produced homogenous components I and II are filled with the aid of conventional devices (e.g. presses) in the usual way, e.g. into cartridges or containers (e.g. hobbocks). Filling can also take place into containers of aluminum composite film as well as of polyethylene or polypropylene, preference being given to polypropylene over polyethylene due to the lower water vapour permeability.

Unless it is coloured for practical or esthetic reasons, the inventive molding material or its components I and II are colourless to white, low viscosity, putty-like to liquid materials. In case the inventive molding material is in the form of a two-component molding material, component I and component II are mixed with each other as homogeously as possible before processing, which mixing again takes place by using conventional devices. It is desirable that the mixtue of components I and II is a low viscosity putty-like material, i.e. it shall not flow but stand. However, it remains cold-workable and its viscosity is always sufficient to enable it to be pressed into the smallest honeycombs, e.g. with a key width of 2.8 mm. The mixing ratio of components I and II is usually in the range of 3:1 to 1:10.

The advantage of the inventive molding material, especially in form of a two-component material, over the one-component molding material of prior application Ser. No. 24 026 is the quicker curing at room temperature or temperatures up to 80° C. Thus at temperatures of 60° to 80° C. curing usually is achieved within 15 minutes or less. At these temperatures the curing times of the one-component molding material according to prior application Ser. No. 24 026 are six hours and more.

Due to the quick curing, which even takes place without the use of presses or autoclaves, the inventive molding material is not only useful as a construction material and especially a fire protecting construction material, which is advantageously used for the production and coating of molded parts and plate elements for the construction of land, air and water vehicles, but also particularly as repair material and especially a fire protection repair material with which the aforementioned molded parts and plate elements can be repaired. Thus it is now possible for the first time to repair damaged construction units or components in such a manner that they meet the requirements of international test standards like FAR 25.853 and ATS 1000.001.

Repair methods with mastics and honeycomb or prepreg substitutes are known. However, in case of phenol or epoxyresin prepregs the construction component has to be removed from the airplane and to be costly repaired in the aircraft works in the press at high pressure and temperatures of 120° to 170° C. According to another method the repair is carried out with stiff or precured prepreg pads coated with a hot melt, which pads are ironed at 70° to 80° C. However, this procedure does not lead to such a great stability as it is obtained when using the inventive molding material. Further this method is only applicable to a limited extent with bent or otherwise formed construction components. Finally working at room temperature or temperatures up to 60° C. is also not possible. Furthermore exceeding the ironing temperature leads to adhesion problems.

In contrast stable and optically unobjectionable repairs can be achieved with the inventive molding material alone (without prepreg pads) or covered with polyvinyl fluoride film pads (Tedlar films) and the like with or without heating (room temperature to 60° C.).

In addition construction components can be produced with the inventive molding material according to the OMC process (open mold compound) in which an open mold is lacquered and the lacquer is cured. In this mold the molding material is cured (room temperature to 80° C.) and a construction component ready for the proposed end-use is obtained, i.e. no further finishing treatment is required. By this procedure a non-flammability for lacquer coatings of up to 200 $\mu$m thickness is achieved which meets the test standards FAR 25.853 and ATS 1000.001.

Another important advantage of the inventive molding material is that it is solvent-free. This facilitates to a considerable extent the processing thereof, because in view of the ever stricter regulations protecting the environment solvent-containing molding compounds lead to considerable additional costs.

When curing the inventive molding material, the expert will obviously take account of the molding geometry and thermal conductivity and will choose the necessary curing time accordingly. Curing takes place at usual pressures, e.g. atmospheric pressure (pressures of about 0.5 to 50 bar normally being used).

As indicated hereinbefore, the molding material according to the invention can be used in many ways, i.e. as a construction material and especially a fire protection construction material for the most varied purposes (a large number of possible applications for the inventive molding material are e.g. given in the paragraph bridging pp 25 and 26 of DE-OS No. 27 14 006). Thus, the molding material according to the invention can be used for producing foams (rigid foams with bulk densities between 150 and 300 kg/m$^3$). A particularly important use is in the production of composite systems or sandwich structures constituted by surfaces made from glass fabric or carbon fibre prepregs and cores of molding compounds or foams with bulk densities of 150 to 1000 kg/m$^3$. Particular reference is made in this connection to the processing of the inventive molding material in conjunction with the honeycomb materials especially used in aircrft building. The inventive molding material can be pressed into these honeycomb materials and then cured therein, which leads to moldings with a great hardness, compression strength and excellent fire protection characteristics.

For many applications it is recommendable to combine the inventive molding material with glas or carbon fibre fabrics. Satin, linen, atlas, roving, unidirectional material and staple fibre fabrics are particularly suitable for this. Also fleeces and tubular braids can be used. Another suitable fabric material is constituted by aramide glass fibres or poly-(p-phenylene terephthalic amide)-carbon fibre fabric (re aramide and PPDT cf. e.g. Neue polymere Werkstoffe, 1969–1974, Carl Hanser Verlag, 1975, chapters 9.1 and 9.2). As a function of the intended use such fabrics, fleeces or braids can be filled with the inventive molding material and then cured or can be applied externally to the molding material, followed by the curing of the latter. The latter can e.g. take place in such a way that a mold is lined with one of said fabrics, fleeces or braids and then the inventive molding compound is introduced and cured. This leads to an extremely stable union between the cured molding material and the fabric, fleece or braid. The introduced fabrics and fleeces have preferably weights of 50 to 600 g/m$^2$ and mainly of 100 to 200 g/m$^2$.

The products produced from the molding material according to the invention have excellent non-flammability characteristics, e.g. 10 mm thick plates without reinforcement withstand a fire test in the form of a five minute flame exposure (1080° C.) to the extent that no dripping, afterflaming or burning through is observed.

The inventive molding material is suitable as a filling mass and putty, as well as a coating material. However, the main use is in composite structures of fabrics and masses. Without going into detail, the most important uses are indicated: reinforcing sandwich panels and composite components in the aircraft industry, ships, railways and other vehicles (e.g. racing cars and tankers), where fire protection is required; for the car industry: engine enclosures, lining of engine cowlings for preventing carburettor fires and the like; building industry: fire inhibiting seals for wall opeings, closures for manholes, airconditioning shafts, cover plates, fire protection-walls, fillings for fire protection doors, or in an embodiment with a greater thickness of 30 to 50 mm as doors; linings or coverings of data protection cabinets and safes.

The products obtained with the inventive molding material following the curing thereof can be sawn, milled, drilled, nailed, screwed, bonded and mechanically worked in any other way (cf. DE-OS No. 27 14 006, last paragraph on p 26, where processing examples are given which also apply to the inventive molding material).

The inventive molding material can obviously also be processed in conjunction with the conventional aids used in the present technical field and these aids can be incorporated into the molding material or e.g. added during processing and curing. These aids are known to the expert, so that there is no need to illustrate them (cf. e.g. DE-OS No. 27 14 006, pp 20 to 22).

It is pointed out in this connection that it is particularly advantageous to cure the inventive molding material in union with polycondensation products, such as phenolic resins, where splitting off water occurs. It is also of interest that a curing action is obtained with excess monomers (e.g. styrene) of the laminates (prepreg components). The interaction with e.g. styrene leads to an extremely strong connection with the laminate. The aforementioned characteristics of the inventive molding material provide a considerably difference compared with the known molding compounds (e.g. DE-OS No. 27 14 006) and the commercially available edge and core filler materials based on epoxy resin, as well as formulations with phenolic resin components (see above), which either do not fulfil the requirements of ATS 1000.001 or the necessary bonding of prepregs to polycondensation products, such as phenolic resin masses, and furthermore cannot be cured at ambient temperature.

It is finally pointed out that the inventive molding material, after curing, has a very good attachment, adhesive strength and compatibility with all commercially available plastics and even provides usable adhesion to polyolefins, Teflon (PTFE) and the like. Satisfactory adhesive strengths are also obtained on metal, so that the filling mass according to the invention can also be used for the construction of sandwich components with metal outer surfaces and a filling mass core or as coatings on metallic materials as structural fire protection layer. Suitable metallic materials are e.g. steel, aluminum etc.

The following examples describing preferred embodiments are given for illustrative purposes only and are not meant to be a limitation on the subject invention. In all cases, unless otherwise noted, all parts and percentages are by weight.

EXAMPLE 1

A one-component molding material of components A, B, C, D and E was prepared. 50 g of commercially available isocyanurate of 1,6-hexamethylene diisocyanate with a NCO content of 21.5% (hereinafer referred to only as isocyanurate), 5 g crude MDI with a NCO content of 31%, 12 g secondary ammonium phosphate, 1 g zeolite, 1 g pyrogenic silica and 28 g hollow glass microspheres with a density of 0.35 g/cm$^3$ were mixed. Into the obtained mixture 50 g of a propoxylated trimethylolpropane with an OH content of 11.5% were homogeneously pugged. The resulting mixture had a processing time of about 8 hours. It was cured in a closed mold for 30 minutes at 80° C. The cured product had a bulk density of 650 kg/m$^3$ and a compression strength at ambient temperature of about 22 N/mm$^2$.

EXAMPLE 2

A two-component molding material was prepared by using the same components as in Example 1. Component I was prepared from 500 g propoxylated trimethylolpropane, 30 g hollow glass microspheres, 19 g secondary ammonium phosphate and 1 g zeolite. Component II was prepared from 500 g isocyanurate, 50 g crude MDI, 101 g secondary ammonium phosphate, 9 g zeolite, 10 g pyrogenic silica and 250 g hollow glass microspheres. Components I and II were prepared separately by homogeneously mixing the aforementioned components. In this maner two stable components were obtained, component II having a stability of 10 days at room temperature and 90 days at −18° C. After mixing the two so produced components the resulting mixture had a processing time of about 8 hours. Curing took place as in Example 1 and the cured product had practically the same bulk density and compression strength as stated in Example 1.

EXAMPLE 3

Example 2 was repeated except that in component I the propoxylated trimethylol propane was replaced by 500 g of an oligomeric multifunctional glycolether with an OH content of 22%. After mixing components I and II the available processing time at ambient temperature was six hours. After curing in a closed mold for 30 minutes at 80° C. a molded article having a bulk density of about 630 kg/m$^3$ and a compression strength of about 19.5 N/mm$^2$ was obtained. The curing of the mixture at ambient temperature required about 12 hours.

EXAMPLE 4

The procedure of Examples 2 and 3 was repeated but 500 g of an oligomeric difunctional polyesterol with an OH content of 2.0% were used as polyol. The processing time of the mixture of components I and II was about 12 hours. Curing took place for 60 minutes at 80° C. while the curing time at room temperature was about 36 hours. The cured product had a bulk density of about 655 kg/m$^3$ and a compression strength at ambient temperature of about 14.2 N/mm$^2$.

EXAMPLE 5

The procedure of Example 3 and 4 was repeated but 500 g of a branched polyalcohol with ether and ester groups with an OH content of 5% were used as polyol, said polyalcohol being a blockcopolymer according to definition (d) of component A (see above and compare claim 5). The mixture of components I and II provided a processing time of about 8 hours. Again curing could take place within 60 minutes at 80° C. or within 24 hours at ambient temperature. The cured product had a bulk density of 600 kg/m$^3$ and a compression strength at ambient temperature of about 14.8 N/mm$^2$.

EXAMPLE 6

The procedure of Examples 2 to 5 was repeated but 500 g saturated low molecular fatty-acid-modified, oligomeric polyesterol with an OH-content of about 5% were used as polyol. The processing time of the mixture of components I and II was about 12 hours. Again curing could take place within 60 minutes at 80° C. or within 24 hours at ambient temperature. The cured product had a bulk density of 580 kg/m$^3$ and a compression strength at ambient temperature of about 17 N/mm$^2$.

EXAMPLE 7

A two-component mass was prepared from:
Component I:
60 g propoxylated trimethylolpropane (OH content=11.5%)
10 g of a mixture of
  50% secondary ammonium phosphate,
  5% primary ammonium phosphate,
  20% azodicarbonamide,
  5% potassium silicate,
  10% calcium orthophosphate and
  10% CaO
10 g carbon fibres with cutting length of 400 μm
10 g hollow glass microspheres with a density of 0.35 g/cm$^3$
2 g finely divided silica
0.5 g dibutyl tin laurate and
Component II:
150 g isocyanurate
20 g of a mixture of 80% crude MDI, 20% IPDI and 10% dimerized triazine of TDI,
50 g of a mixture of 80% secondary ammonium phosphate, 15% zeolite and 5% finely divided silica,
100 g hollow glass microspheres with a density of 0.40 g/cm$^3$
10 g carbon fibres with a cutting length of 100 μm.

The mixture of crude MDI, IPDI and dimerized triazine of TDI were produced in such a manner that IPDI and dimerized triazine of TDI were partially dissolved and partially finely suspended in the crude MDI Components I and II were homogeneously mixed and cured within two hours at 40° C. in a closed mold. The cured product had a bulk density of 750 kg/m$^3$. The compression strength at ambient temperature was 38 N/mm$^2$ after seven days and 52 N/mm$^2$ after 30 days.

At 80° C. the compression strength after seven days was 12 N/mm² and after 30 days 19 N/mm².

EXAMPLE 8

A two-component mass was prepared from:
Component I:
10 g fatty-acid-modified, oligomeric polyesterol with an OH content of 5%,
3 g primary ammonium phosphate,
1 g azodicarbonamide
4 g foamed clay (NORPRIL 250) with a bulk density of 250 kg/m³,
1 g hollow glass microspheres with a density of 0.35 g/m³ and
Component II:
60 g isocyanurate,
5 g of a mixture of 80% crude MDI, 10% NDI and 10% of a copolymer triazine of TDI and HDI,
1 g finely divided silica,
14 g secondary ammonium phosphate
0.1 g triethylamine,
0.1 g dibutyl tin dilaurate,
10 g cobweb-whiskers (XEVEX)
10 g hollow glass microspheres with a density of 0.38 g/cm³

The mixture of crude MDI, NDI and copolymeric triazine of TDI and HDI was produced like in Example 7 by partially suspending and dissolving NDI and copolymeric triazine of TDI and HDI in the crude MDI.

The components were separately conveyed through a tandem unit with bucket piston pumps at about 80 to 120 bar (pipe diameter 30 mm) and homogeneously mixed in a mixing ratio of component I to component II of 3:1 through a static mixer. Then curing took place for one hour at 60° C. in a closed mold. The cured product had a bulk density of 680 kg/m³ and a compression strength at ambient temperature of 32.0 N/mm² after 14 days.

EXAMPLE 9

A two-component mass was produced from:

Component I:

80 g oligomeric multifunctional glycolether with an OH content of 22%
20 g secondary ammonium phosphate and
Component II:
32 g isocuanurate
8 g secondary ammonium phosphate.

Components I and II were homogeneously mixed in a ratio of 2:5 and cured for 120 minutes at 80° C. in a closed form. The cured product had a bulk density of 1300 kg/m³ and a compression strength at ambient temperature of 40 N/mm² or at 80° C. of 6.5 N/mm².

EXAMPLE 10

Two-component molding masses were produced as in Example 2 except for the addition of different amounts of promoters:
a. Example 2+0.2 g DBTDL
b. Example 2+0.2 g DBTDL+0.1 g TEA
c. Example 2+0.8 g DBTDL
DBTDL=dibutyl tin dilaurate
TEA=triethylamine The properties of the mixtures of components I and II and the obtained cured products are summarized in the following table:

|  | (a) | (b) | (c) |
|---|---|---|---|
| Bulk density (kg/m³) | 680 | 640 | 610 |
| Processing time at ambient temperature | 2 h | 20 min | 5 min |
| Compression strength at ambient temperature after two days: (N/mm²) | 18.0 | 19.2 | 34.5 |
| at ambient temperature after 30 days (N/mm²) | 22.8 | 25.4 | 36.8 |

We claim:
1. Molding material based on polyisocyanato-isocyanurates, polyols and flameproofing and fireproofing agents comprising:
A. 5 to 40% by weight of branched polyols having an OH content of 2 to 22% by weight,
B. 20 to 40% by weight of the isocyanurate of 1,6-hexamethylene diisocyanate,
C. 0 to 20% by weight of a member selected from the group consisting of (a) crude MDI, (b) prepolymer of polyol and crude MDI, (c) isophorone diisocyanate (IPDI), and mixtures thereof
D. 5 to 20% by weight of a mixture of:
 (a) 50 to 100% by weight of secondary ammonium phosphate,
 b. 0 to 50% by weight of primary ammonium phosphate,
 c. 0 to 30% by weight azodicarbonamide,
 d. 0 to 20% by weight zeolite and/or ground alkali silicate,
 e. 0 to 10% by weight finely divided silica,
 f. 0 to 10% by weight calcium orthophosphate and
 g. 0 to 20% by weight calcined calcium oxide,
E. 0 to 50% by weight filler and
F. 0 to 5% by weight promoter.

2. Molding material according to claim 1 in the form of a two-component molding material, in which component I contains component A and component II contains component B and component C.

3. Molding material according to claim 2, wherein components I and II have the following composition:
Component I:
 1. 40 to 80% by weight component A,
 2. 10 to 20% by weight component D,
 3. 0 to 50% by weight component E and
 4. 0 to 5% by weight component F
and
Component II:
 1. 40 to 80% by weight component B,
 2. 0 to 20% by weight component C,
 3. 5 to 20% by weight component D,
 4. 0 to 50% by weight component E and
 5. 0 to 5% by weight component F,
the weight percentages being based on the total amount of component I or component II, respectively.

4. Molding material according to claim 2, wherein the weight mixing ratio of components I and II is in the range of 3:1 to 1:10.

5. Molding material according to claim 1, wherein polyol component A consists of a member selected from the group consisting of
 a. propoxylated trimethylol propane with an OH content of about 11.5% by weight,
 b. oligomeric multifunctional glycolether with an OH content of about 22% by weight,
 c. oligomeric bifunctional polyesterol with an OH content of about 2 to 9% by weight, d. branched blockcopolymers of (a) or (b) with (c) with an OH content of about 5% by weight,
e. fatty-acid-modified, oligomeric polyesterols with and OH content of about 5% by weight, and
f. mixtures comprising two or more of (a), (b), (c), (d) and (e).

6. Molding material according to claim 1, wherein component D consists of particles with a size in the range of 0.5 to 150 μm.

7. Molding material according to claim 6, wherein component D has a particle size distribution such that 70 to 90% by weight have a size of 5 to 100 μm, no more than 5% by weight a size of more than 100 μm and no less than 5% by weight a size of less than 5 μm.

8. Molding material according to claim 1, wherein component E comprises one or more fillers selected from the group consisting of fly ash, silica, $B_4C$, hollow glass microspheres, hollow phenolic resin microspheres, carbon fibres, pre-ox fibres, pre-ox fibres, glass fibres, metal fibres, aluminium flakes, cobweb-whiskers, melamine resin powders and foamed clays.

9. Molding material according to claim 8, wherein the carbon fibres or pre-ox fibres have a thickness of 0.001 to 0.1 mm and a length of 0.005 to 15 mm and particularly 0.1 to 5 mm.

10. Molding material according to claim 1, wherein component C further includes a member selected from the group consisting of (d) dimerized triazine of TDI, (e) copolymerized triazine of TDI and HDI, (f) naphthalene diisocyanate, and (g) mixtures thereof.

11. Molding material according to claim 10 in the form of a two-component molding material, in which component I contains component A and component II contains component B and component C.

12. Molding material according to claim 11, wherein components I and II have the following composition:
Component I:
1. 40 to 80% by weight component A,
2. 10 to 20% by weight component D,
3. 0 to 50% by weight component E and
4. 0 to 5% by weight component F and
Component II:
1. 40 to 80% by weight component B,
2. 0 to 20% by weight component C,
3. 5 to 20% by weight component D,
4. 0 to 50% by weight component E and
5. 0 to 5% by weight component F,
the weight percentages being based on the total amount of component I or component II, respectively.

13. Molding material according to claim 11, wherein the weight mixing ration of components I and II is in the range of 3:1 to 1:10.

14. A method for the manufacture of molded components and platen elements and for the repair of said molded components and plate elements comprising preparing a molding material by admixing:
A. 5 to 50% by weight of branched polyols having an OH content of 2 to 22% by weight,
B. 20 to 40% by weight of the isocyanurate of 1,6-hexamethylene diisocyanate,
C. 0 to 20% by weight of a member selected from the group consisting of (a) crude MDI, (b) prepolymer of polyol and crude MDI, (c) isophorone diisocyanate (IPDI), and mixtures thereof,
D. 5 to 20% by weight of a mixture of:
  a. 50 to 100% by weight of secondary ammonium phosphate,
  b. 0 to 50% by weight of primary ammonium phosphate,
  c. 0 to 30% by weight azodicarbonamide,
  d. 0 to 20% by weight zeolite and/or ground alkali silicate,
  e. 0 to 10% by weight finely divided silica,
  f. 0 to 10% by weight calcium orthophosphate and
  g. 0 to 20% by weight calcined calcium oxide,
E. 0 to 50% by weight filler and
F. 0 to 5% by weight promoter.

* * * * *